United States Patent Office 3,004,915
Patented Oct. 17, 1961

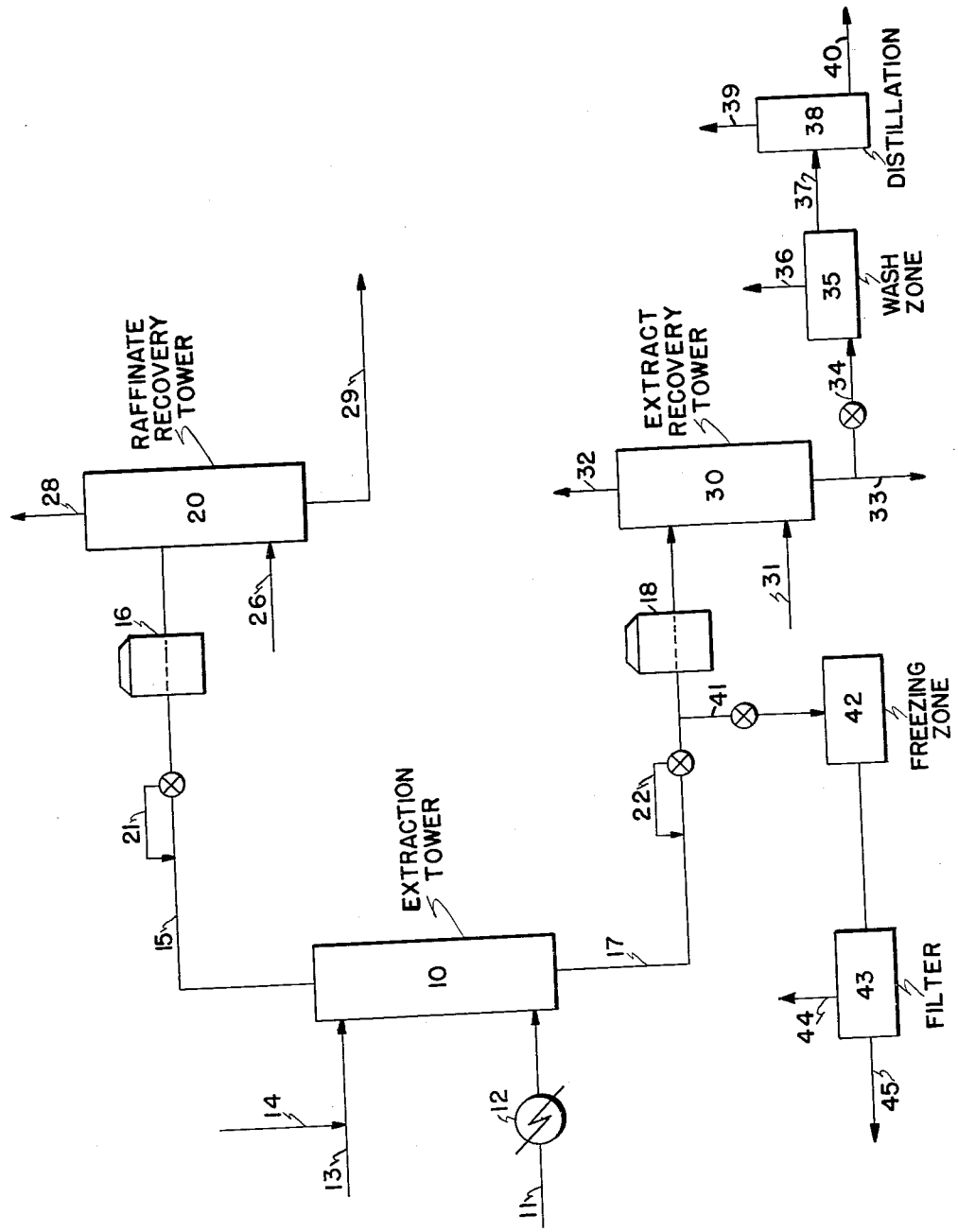

3,004,915
SOLVENT TREATING OF PETROLEUM FRACTIONS
Fred H. Kant, Cranford, N.J., assignor to Esso Research and Engineering Company, a corporation of Delaware
Filed Dec. 30, 1959, Ser. No. 863,033
7 Claims. (Cl. 208—323)

This invention relates to an improved process for the solvent extraction of liquid petroleum oil fractions to separate their aromatic constituents from their paraffinic constituents. The invention is particularly directed to improvements in the refining of lubricating oil fractions by phenol extraction.

The use of various selective solvents for refining petroleum oils is well known. In the treatment of lubricating oil fractions, one of the commonly used solvents is phenol, which has a preferential selectivity for the more aromatic constituents of the lubricating oil as compared to its more paraffinic constituents. The extracting of lubricating oil fractions with phenol has gained wide recognition as a highly desirable refining step. In general the process consists in treating the lubricating oil with phenol at a temperature at which the phenol is liquid whereby two layers of liquid are formed, the one layer, which is known as the extract, containing most of the phenol and the undesirable constituents that have been extracted from the lubricating oil, and the other layer, which is known as the raffinate, consisting of the refined oil as well as some phenol.

The usual procedure for conducting the phenol extraction is to contact the oil and the phenol in a countercurrent tower treating operation in which the oil, which is the lighter component, is introduced into the bottom of the tower and the phenol, being the heavier component, is introduced into the top of the tower. The oil and phenol phases then flow countercurrently and come into intimate contact with each other, this contact usually being assisted by various contacting and distributing means. The pressure and temperature conditions for the extraction operation will depend upon the particular oil being treated, the volume of solvent used per volume of oil being treated, and the quality of the desired product. In general the temperature will lie somewhere between the melting point of the phenol and the temperature at which complete miscibility occurs between the oil and the phenol. The solvent-rich or extract phase will be removed from the bottom of the tower, and the solvent-poor or raffinate phase will be removed from the top of the tower.

In a phenol extraction process both the raffinate phase and the extract phase contain dissolved phenol which must be recovered. This recovery involves considerable expense and contributes appreciably to the total cost of the solvent refining process. To recover the phenol the raffinate and extract phases are usually heated to temperatures in the range of 450° to 750° F. to vaporize the phenol which can then be flashed off. Additionally, for economical operation it is necessary to recover the remaining small quantities of phenol which are still present in the raffinate and extract. This is usually done by stripping the fractions with steam or with a suitable gas. In view of the expense involved in recovering phenol there is a need for increasing the efficiency of extraction so that smaller amounts of solvent can be used thereby leading to reduced investment and operating costs for solvent recovery.

In accordance with the present invention, increased efficiency in phenol extraction is obtained by adding to the phenol a substance which will increase the solubility of the compounds that are to be extracted, which in the case of lubricating oil fractions means increasing the solubility of the aromatic hydrocarbons and particularly the polycyclic aromatics. This is accomplished by adding to the phenol a nitrophenol or nitrocresol whose acidity is greater than phenol. Such nitrophenols or nitrocresols are those whose nitro groups are in either the ortho or the para position relative to the hydroxy group. These nitrophenols are selected from the group consisting of orthonitrophenol, paranitrophenol, 2,4-dinitrophenol, 2,6-dinitrophenol, and 2,4,6-trinitrophenol or the corresponding cresols. The nitrophenol compounds are employed in the proportion of from 1 to 25 percent by weight based on the phenol. A range of from 5 to 15 percent is preferred. The particular percentage used will in large measure depend on the amount of polycyclic aromatics in the mineral oil fraction being extracted.

The nature of the invention will be more readily understood when reference is made to the drawing in which the single figure is a schematic flow plan of a process for conducting the phenol extraction.

Referring specifically to the drawing a phenol extraction tower 10 is provided which may be packed with suitable contacting material such as Raschig rings, baffle plates or disc and donut plates. Preferably the contacting means comprises a plurality of underflow weir trays. The lubricating oil fraction to be treated enters through feed line 11 and is heated to the proper inlet temperature by means of heat exchanger 12. Phenol enters the extraction tower through phenol line 13 and flows downwardly through the tower so as to effect countercurrent contact with the upflowing lubricating oil. The oil that has been contacted with the phenol leaves the top of the tower as a raffinate phase through line 15, is heated in a heater or furnace 16 and is then sent to a raffinate recovery tower 20. Similarly the extract phase leaves the bottom of the extraction tower through line 17 and passes through heater or furnace 18 and is sent into an extract recovery tower 30.

The phenol employed in this extraction is, of course, the phenol that has been modified by the addition of a nitrophenol, as mentioned above. The previously prepared blend of phenol and nitrophenol may be introduced through line 13 or alternatively a properly proportioned stream of the nitrophenol may be introduced through line 14. Line 14 may also be employed for the introduction of a small proportion of an anti-solvent such as water which is common practice in phenol extraction. Thus, from 0.1 to 5 weight percent of water, based on the phenol, may be used.

Preferably the extraction in tower 10 is run under pressure, using pressures of from about 50 to about 250 p.s.i.g., so that the raffinate phase and extract phase will each flow to its respective recovery tower without further pumping. Means for controlling this operation include pumping. Means for controlling this operation include pumping valve 21 in line 15, which is adjusted to flow control valve 21 in line 15, which is adjusted to maintain the desired phenol-oil interface in the extraction tower, and back-pressure control valve 22 in line 17, which serves to regulate the flow of extract phase from the tower. Pressure operation in this manner eliminates the need for the surge drums conventionally employed in phenol extraction plants to receive the extract and raffinate phases prior to further handling, as well as the booster pumps conventionally used to send these phases to their respective recovery systems.

In raffinate recovery tower 20 the phenol solvent is extracted from the raffinate by means of steam or other stripping gas, such as propane, which is introduced through line 26. Tower 20 may include one or more stripping and/or rectifying zones containing beds of suitable contacting surfaces such as rings or bubble cap plates. The upper portion of tower 20 may contain a rectifying zone for the condensation of oil that has been vaporized in the furnace and in the lower stripping zones of the tower. A mixture of stripping gas, phenol vapors, nitrophenol vapors, and traces of oil will leave the tower through line 28 while the stripped raffinate will be recovered by means of line 29.

The extract recovery tower 30 likewise includes a rectifying zone and stripping zones so that vaporized extract oil may be condensed in the upper portion of the tower and flow back into the lower stripping zone. A suitable stripping gas is introduced through line 31. Stripping gas and phenol and nitrophenol vapors leave the tower through line 32 while stripped extract leaves the tower through line 33. The phenol and nitrophenol in the effluent gases in lines 28 and 32 are of course recovered by means not shown to be used again in the extraction process.

In the event that the particular nitrophenol cannot be completely recovered by the flashing and stripping operation described, or in cases where the economics are more favorable for doing so, the operation may be augmented by a washing step. Thus the stripped extract in line 33 may be sent via line 34 to a wash zone 35 where the remaining nitrophenol is removed by water washing. The washed oil is recovered in line 36 and the wash water is conducted via line 37 to distillation zone 38 to separate water and nitrophenol via lines 39 and 40.

An alternative recovery procedure is to separate the phenol-nitrophenol mixture by freezing it out of the oil. Thus the extract phase, for example, may be conducted via line 41 to freezing zone 42 where it is chilled sufficiently to crystallize out the phenol and nitrophenol. The chilled mixture is then sent to filter 43 where separation of crystals from oil is effected, the separated material then being removed via lines 44 and 45.

It is to be understood that these alternate separation procedures are likewise applicable to the raffinate phase. The flow plans will be similar to those shown for the extract phase but have been omitted from the drawing in order that the latter would not be unduly complex.

The benefits derived from employing the modified solvent of the present invention are demonstrated by the data obtained in the following examples.

EXAMPLE 1

An aromatic blend was prepared consisting of a mixture of secondary butyl benzene (33.9%), naphthalene (17.1%), phenanthrene (10.0%), and pyrene (5.2%) dissolved in normal dodecane (33.9%). (All percentages are by weight.) This blend was then extracted with modified phenol at various treat levels to establish a basis for subsequent comparison with phenol to which had been added 12 weight percent of 2,4-dinitrophenol. The modified phenol consisted of 80 weight percent phenol and 20 weight percent ethylene glycol, the latter serving as an antisolvent to avoid excessive solubility of the aromatics in the phenol. The extractions were made at 75° F. using a single stage batch procedure wherein the oil and solvent were stirred for 30 minutes at the extraction temperature after which the phases were allowed to separate. The extract phase was washed with caustic and then with water to remove phenol (and nitrophenols when they were used), and the amount of hydrocarbon recovered was measured. With a 100% treat (1 to 1 solvent to oil volume ratio) the solvent containing the dinitrophenol gave a 33 volume percent hydrocarbon solubility in the extract. For comparison the results without dinitrophenol from a 100% treat (giving 37 volume percent) and from a 150% treat (giving 31 volume percent hydrocarbon solubility) were interpolated to a 33 volume percent hydrocarbon solubility. The results of these tests are shown in Table I in terms of a separation factor relative to 1-ring aromatics. The data indicate that, at 33 volume percent hydrocarbon solubility in the extract, the addition of the dinitrophenol improved the selectivity for removal of 3-ring and 4-ring aromatics.

Table I

| Sep. Factor Rel. to 1-Ring Arom. | Phenol [1] | Phenol + 12% 2,4 DNP |
|---|---|---|
| 2-Ring | 1.3 | 1.2 |
| 3-Ring | 1.8 | 3.8 |
| 4-Ring | 2.0 | 3.8 |

[1] 80% phenol; 20% ethylene glycol.

The separation factor is a measure of the selectivity of the extraction, and is calculated as the volume ratio of a given compound (e.g., the 2-ring aromatics in this case) to a key compound (1-ring aromatics in this instance) in the extract phase, divided by the same ratio in the raffinate. The increase in the separation factor for 3- and 4-ring aromatics with the addition of dinitrophenol shows an increased selectivity for these types. Furthermore, the fact that this improvement was obtained at constant hydrocarbon solubility indicates that the dinitrophenol is not acting simply as an anti-solvent such as water, glycol, etc. It is really acting to promote more solution of these aromatics presumably due to the fact that molecular complexes are formed.

EXAMPLE 2

Aqueous phenol (98% phenol and 2% water) (solvent A) and a mixture of 88 parts of that solvent with 12 parts of 2,4-dinitrophenol (solvent B) were compared for their solvent extraction efficiency in the extraction of a medium distillate naphthenic lubricating oil having a viscosity index of 40, a viscosity at 100° F. of 425 SSU and an A.P.I. gravity of 21.2. The extractions were conducted in the same manner as in Example 1. The raffinate phase was also washed with caustic and with water, and the viscosity of the washed sample was determined at 100° F. and at 210° F. in order to calculate the viscosity index. The results obtained are given in Table II.

Table II

| | Solvent A | Solvent B |
|---|---|---|
| Solvent/Oil Ratio (Volume) | 0.70 | 0.66 |
| Temperature, °F | 150 | 150 |
| Raffinate Yield, vol. percent [1] | 78 | 77.5 |
| V.I. of Feed | 40 | 40 |
| V.I. of Raffinate | 49 | 56.5 |
| Oil Solub. in Extract,[2] Vol. percent | 30.5 | 31 |

[1] Raff. yield = 100% − $\frac{\text{oil recov. fr. extract}}{\text{oil feed}} \times 100$

[2] Oil solub. in extract = $\frac{\text{oil recov. fr. extract}}{\text{total extract vol. before washing}}$ The data in Table II show that when the conditions are adjusted for constant oil solubility in the extract there is an improvement in viscosity index over the base case. What this means is that more selective extraction has been performed when using solvent B.

The extraction efficiencies with the two solvents were compared at various levels of oil solubility in the extract, these levels being obtained by adjusting extraction conditions. The results are presented in Table III.

Table III

| HC Sol. in Ext., Vol. Percent | Raffinate Yield, Vol. Percent | Avg. V.I. Advantage over Base Case |
|---|---|---|
| 20–22 | 60–63 | 6 |
| 23–26 | 64–67 | 10 |
| 26–28 | 68–72 | 7 |
| 28–31 | 73–76 | 8 |

As the data in Table III show, there is a considerable advantage in viscosity index when employing the solvent mixture of phenol and 2,4-dinitrophenol as compared with the phenol alone. From a practical standpoint, the V.I. gain can be considered as an improvement in yield. Alternatively, the advantage in viscosity index can be interpreted as requiring a lower intensity solvent treat for a given V.I. when using the mixed solvent. This is an important advantage because, as pointed out above, solvent requirement is the most expensive item in phenol extraction.

EXAMPLE 3

In a manner similar to Example 2, the efficiency of a solvent mixture of 95 parts of the aqueous phenol and 5 parts of 2,4-dinitrophenol (solvent C) was compared with the aqueous phenol alone (solvent A) in extracting additional quantities of the same lubricating oil and adjusting the temperature so that the same value of oil solubility in the extract was obtained in each case. The results are shown in Table IV.

Table IV

|  | Solvent A | Solvent C |
|---|---|---|
| Solvent/Oil Ratio | 1.0 | 1.0 |
| Temperature, °F | 150 | 130 |
| Raffinate Yield, Vol. Percent | 68 | 71 |
| V. I. of Feed | 40 | 40 |
| V. I. of Raffinate | 58 | 66 |
| Oil Solub. in Extract, Vol. Percent | 25.5 | 25 |

The data in Table IV show that even at 5 percent concentration there is a marked advantage in V.I. with the modified solvent as compared to the base case at the same oil solubility in the extract.

EXAMPLE 4

In the same manner as in Examples 2 and 3 the efficiency of a solvent mixture of aqueous phenol with 10 parts of orthonitrophenol was compared with that of the aqueous phenol. Additional quantities of the same lubricating oil were used as in the preceding examples. For comparison purposes an extraction was also made with a solvent mixture of aqueous phenol and 10 parts of 2,4-dinitrophenol. The results are given in Table V.

Table V

|  | Solvent A | Solvent D | Solvent E |
|---|---|---|---|
| Solvent/Oil Ratio | 1.5 | 1.5 | 1.5 |
| Temperature, °F | 150 | 150 | 150 |
| Raffinate Yield, Vol. Percent | 58 | 56 | 59.5 |
| V.I. of Raffinate | 59 | 68 | 75 |
| Oil Solubility in Extract, Vol. Percent | 23.5 | 24 | 22 |

Solvent A—98 parts phenol, 2 parts water (weight).
Solvent D—90 parts by weight of Solvent A; 10 parts by weight o-nitrophenol.
Solvent E—90 parts by weight of Solvent A; 10 parts by weight 2,4-dinitrophenol.

By comparing the data obtained with Solvent D with the data from the base case (solvent A) it will be seen that at a constant oil solubility level in the extract phase, the addition of o-nitrophenol to phenol results in a higher viscosity index oil. The data obtained with solvent E indicate that o-nitrophenol and 2,4-dinitrophenol are roughly comparable in their effectiveness, with some advantage indicated for the latter.

While the invention has primarily been described with reference to the extraction of mineral lubricating oil fractions it is also applicable to the extraction of other relatively high boiling stock, particularly those that are likely to contain polycyclic aromatics. Such stocks include gas oils, heating oils, and catalytic cycle stocks, for example.

Also, while the above examples have primarily illustrated the separation of hydrocarbons of different types from each other, the invention is also applicable to the removal of non-hydrocarbon constituents from mineral oil compositions. This is shown by the following example.

EXAMPLE 5

A blend of the following constituents was prepared: dodecane (50%), secondary butyl benzene (30%), dibutyl sulfide (5%), dibenzothiophene (5%), indole (5%), and quinoline (5%), all percentages being by weight. In the manner of Example 1, portions of this blend were then extracted at various treat levels with a modified phenol consisting of 80 weight percent phenol and 20 weight percent ethylene glycol, using an extraction temperature of 72° F. A portion of the blend was also extracted at a 100 percent treat level with a mixture of 90 weight percent of the modified phenol and 10 weight percent of 2,4-dinitrophenol. Under these conditions hydrocarbon solubility in the extract with the latter mixture was 22.5 volume percent. The results for extractions with the phenol-glycol solvent at 18% and 28% hydrocarbon solubility in the extract were interpolated to 22.5 volume per cent and the results compared with those for the solvent containing the dinitrophenol. The separation factors relative to second butyl benzene are presented in Table VI.

Table VI

| Sep. Factor Relative to Secondary Butyl Benzene | Phenol [1] | Phenol [1] + 10% DNP |
|---|---|---|
| Dibutyl Sulfide | 1.5 | 1.3 |
| Dibenzothiophene | 3 | 4.4 |
| Indole | 7 | 9.0 |
| Quinoline | 17 | 24.5 |

[1] 80% phenol; 20% ethylene glycol.

It will be noted from the data in Table VI that the modified solvent gave a marked improvement in the extraction of dibenzothiophene, indole, and quinoline. This is of considerable significance because materials of these types contribute to poor color and poor oxidation stability in mineral oil compositions. Hence methods for their removal are in demand.

Other variations of the invention within its scope and spirit are also contemplated; accordingly the invention is not limited to the specific embodiments herein described. Its scope is to be determined by the appended claims.

What is claimed is:
1. A process for treating a mineral oil fraction which comprises contacting said oil with a selective solvent comprising phenol and from about 1 to about 25 weight percent, based on the phenol, of a nitrophenol selected from the group consisting of ortho-nitrophenol, para-nitrophenol, 2,4-dinitrophenol, 2,6-dinitrophenol, and 2,4,6-trinitrophenol.
2. Process as defined by claim 1 wherein from about 5 to about 15 weight percent of the nitrophenol is employed.
3. Process as defined by claim 1 wherein said petroleum oil comprises a lubricating oil fraction.
4. Process as defined by claim 1 wherein said nitrophenol comprises 2,4-dinitrophenol.
5. Process as defined by claim 1 wherein said nitrophenol comprises ortho-nitrophenol.
6. A process for treating a lubricating oil stock which comprises contacting said oil with a selective solvent comprising 88 parts of a mixture consisting of 98% phenol and 2% water, and 12 parts of 2,4-dinitrophenol, separating an extract phase which contains the phenol solvent mixture and undesirable polycyclic aromatics and a raffinate phase consisting of the refined oil.
7. A process for treating a lubricating oil stock which comprises contacting said oil with a selective solvent comprising 88 parts of a mixture consisting of 98% phenol and 2% water, and 10 parts of orthonitrophenol, separating an extract phase which contains the phenol solvent mixture and undesirable polycyclic aromatics and a raffinate phase consisting of the refined oil.

References Cited in the file of this patent

UNITED STATES PATENTS

| | | |
|---|---|---|
| 2,128,958 | Cunradi et al. | Sept. 6, 1938 |
| 2,250,579 | Gillespie | July 29, 1941 |
| 2,645,596 | Axe | July 14, 1953 |